United States Patent [19]
Lohman et al.

[11] Patent Number: 5,930,785
[45] Date of Patent: Jul. 27, 1999

[54] METHOD FOR DETECTING AND OPTIMIZING QUERIES WITH ENCODING/DECODING TABLES

[75] Inventors: Guy M. Lohman, San Jose, Calif.; Bernhard Schiefer, Scarborough, Canada; Monica S. Urata, Los Gatos, Calif.

[73] Assignee: International Business Machines Corporation, Armonk, N.Y.

[21] Appl. No.: 08/950,674

[22] Filed: Oct. 16, 1997

Related U.S. Application Data

[63] Continuation of application No. 08/414,835, Mar. 31, 1995, abandoned.

[51] Int. Cl.$^6$ .................................................. G06F 17/30
[52] U.S. Cl. ................................. 707/2; 707/3; 707/4
[58] Field of Search ........................... 707/2, 3, 4

[56] References Cited

U.S. PATENT DOCUMENTS

| | | | |
|---|---|---|---|
| 5,197,005 | 3/1993 | Schwartz et al. | 364/419 |
| 5,276,870 | 1/1994 | Shan et al. | 395/600 |
| 5,367,675 | 11/1994 | Cheng et al. | 395/600 |
| 5,386,556 | 1/1995 | Hedin et al. | 395/600 |
| 5,519,859 | 5/1996 | Grace | 395/600 |
| 5,542,073 | 7/1996 | Schiefer et al. | 395/600 |
| 5,548,755 | 8/1996 | Leung et al. | 395/600 |
| 5,560,007 | 9/1996 | Thai | 395/600 |

OTHER PUBLICATIONS

P. G. Selinger et al., Access Path Selection in a Relational Database Management System, Proceedings of ACM SIGMOD Conference, pp. 23–34, May 1979.

K. Ono & G. M. Lohman, Measuring the Complexity of Join Enumeration in Query Optimization, Proceedings of Sixteenth International Conference on Very Large Data Bases, pp. 314–324, Sep. 1990.

*Primary Examiner*—Thomas G. Black
*Assistant Examiner*—Frantz Coby
*Attorney, Agent, or Firm*—James C. Pintner

[57] ABSTRACT

A join optimizer and method for a relational database management system including a data processor, a stored database, and a plurality of database relations, wherein one or more of the relations are retrieved by the processor by means of query commands by performing a plurality of join operations on the relations, the system employing a general purpose heuristic algorithm which excludes or defers Cartesian products as late in the join sequence as possible, the method includes the steps of determining, in association with the execution of, or preferably prior to executing the general purpose algorithm, whether tables referenced in a query command includes a hub table and at least two encoding tables related to the hub table and, when the query command references a hub table and at least two encoding tables, determining the best access plan for the hub table, determining whether the best access plan utilizes an index used to access the hub table and, if so, constructing a plan to join the encoding tables as Cartesian products, constructing a plan to join the hub table and the encoding tables and storing the plans in the data structures of the optimizer for enumeration with other access plans constructed by the optimizer.

15 Claims, 8 Drawing Sheets

METHOD FOR DETECTING AND OPTIMIZING QUERIES WITH ENCODING/DECODING TABLES

This is a continuation of application Ser. No. 08/414,835 filed on Mar. 31, 1995 now abandoned."

The present invention relates relational database management systems for use with data processors and. more particularly, toward optimizing the computer implemented process of retrieving data from databases.

BACKGROUND OF THE INVENTION

Large amounts of data are now typically stored in computer database systems using database management system software to access the data. A relational database management system logically organizes the data into relations. A relation can be thought of as a table where each row is a tuple and each column is a component of the relation designating an attribute. Data can be extracted by querying the database for all tuples in a relation that meet certain criteria using a query statement having the general form:

SELECT <Operation Specification >
FROM <List of Tables Referenced >
WHERE <Boolean Predicate Expression >

The following example query statement on an EMPLOYEE and DEPARTMENT database requests the names, salaries, managers of employees and the location of their departments for those employees who earn between 10000 and 20000 and work in departments on the fifth floor:

SELECT Name, Salary, Manager, Location
FROM EMPLOYEE, DEPARTMENT
WHERE Employee.DNO=Department.DNO and Salary between 10000 and 20000 and Floor=5

The system performs a join operation to connect data from two or more relations whereby tuples with matching attributes are joined to form a new tuple. A join order is the order in which join operations are performed. A join method is a technique which for performing the join of two relations.

A query language provides a set of commands, such as that shown above, for storing, retrieving and deleting data. The language for relational database management systems do not require the user to specify the access path to be used to retrieve the information or to specify the order in which joins are to be performed. Rather, the relational database management system is provided with a program called an optimizer which chooses both join order and an access path for each table in the query statement. Of the many possible choices, the optimizer chooses the access path which minimizes the "total access cost" for performing the entire statement. In the example above, the system may choose to retrieve an EMPLOYEE tuple and find all matching DEPARTMENT tuples or retrieve a DEPARTMENT tuple and find all matching EMPLOYEE tuples or to scan two order tables simultaneously. Additional information about query statements, query optimization, cost evaluation and enumeration may be obtained from "Access Path Selection in a Relational Database Management System", P. G. Selinger et al, Proceedings of ACM SIGMOD Conference, May, 1979 and "Measuring the Complexity of Join Enumeration in Query Optimization", Ono and G. M. Lohman, Proceedings of Sixteenth International Conference on Very Large Data Bases, September 1990, Brisbane, Australia, pp. 314–324, both of which are incorporated herein by reference.

Thus, query optimizers are sophisticated, highly developed systems used in relational database management systems to translate non-procedural queries into a procedural plan for execution. As mentioned, optimizers do so by developing many alternative plans, estimating the cost of execution of each plan and choosing the plan having the lowest estimated cost. Increasing the set of feasible plans that the optimizer evaluates improves, but does not guarantee, the chances that the optimizer will find a better plan while increasing the cost for it to optimize the query.

One of the major decisions an optimizer must make is with respect to the order or sequence in which to join the tables referenced in a query. In most systems, the join operation is implemented as a diadic (2-way) operator. Thus, the optimizer must generate plans that achieve N-way joins as a sequence of 2-way joins. When joining more than a few tables, the number of possible sequences is the dominant factor in the number of alternative plans: N! different sequences are possible for joining N tables. Even when dynamic programming is used, as most systems do, theoreticians have used the exponential worst case complexity to argue that heuristic search methods should be used. However, these search methods cannot guarantee optimality of their solution, as can dynamic programming.

For this reason, many existing optimizers use heuristics within dynamic programming to limit the number of join sequences evaluated. Some systems exclude plans which exclude so-called composite inners in which the inner table (the second operand of a join) is a result which must be materialized in memory or, if it is too big, on disk. While the heuristic avoids this materialization, it may exclude better plans for certain queries. Some systems restrict the class of predicates which qualify to those which are of certain form and some do not derive implied predicates, i.e. predicates which are not specified but which are implied by the query given by the user. Some systems either exclude or always defer Cartesian products as late in the join sequence as possible on the assumption that they would result in large intermediate tables. That is because, by definition, there is no join predicate between Cartesian products that restricts the results and, hence, every row in one table is joined with every row in the other table. This avoids the need for the query optimizer to search many join orderings that are unlikely to be very good since, in general, Cartesian products increase rather than decrease the size of intermediate results and, thus, cause more work to be done later. Again, such heuristics may exclude the optimal plan for certain queries that can benefit from Cartesian products. For instance, if the tables to be joined are small, and especially where they contain one tuple each, a Cartesian product is quite inexpensive and its result may have columns forming a composite key for another, much larger table to be accessed later, thus making the Cartesian product more advantageous. Obviously, these exclusions and limitations are beneficial in most cases.

Database designers often encode wide columns in a large table and store the encodings for each such column in a separate table. For example, the large table might have one column for storing a two-letter abbreviation for a state and another table for storing all of the possible abbreviations of the states and their respected unabbreviated forms; another column for storing country abbreviations and another encoding table for storing all possible country abbreviations and their unabbreviated forms; and so on. There are no join predicates relating the state encoding table and the country encoding table. Since there are no join predicates relating any of the encoding tables to each other, joining the encoding tables to each other is not considered by most join enumerators, since to the general-purpose heuristic excludes or defers Cartesian products as discussed above.

Thus, when there are multi-column indexes on the encoded columns and a query has limiting predicates on the encoding tables, the general-purpose heuristic is actually counter-productive, because it will not consider the best execution strategy, which is to first join the encoding tables as Cartesian products, and then use the rows so formed to access the data table using the multi-column index and the join predicates as start/stop key conditions.

SUMMARY OF THE INVENTION

The present invention seeks to better optimize queries that reference encoding/decoding tables and similar situations. In accordance with the present invention, the optimizer first determines whether such a situation exists, identifies the large or main table (later referred to as a "hub" table) and its encoding tables (later called "spokes" or "spoke tables"), and then evaluates the cost of the plan that overrides the usual deferral of Cartesian products by first joining each of the encoding tables with Cartesian products, before proceeding with the normal query optimization. In this way, the resulting plan competes based upon its estimated cost with all other possible plans (recited as "first plans") that the optimizer considers when determining the optimal plan. The present invention is easily added to most existing query optimizers by being performed before the rest of optimization, and by re-using pieces of the standard query optimization system.

One aspect of the present invention provides an improved query optimizer used for a relational database management system including a data processor, a stored database, and a plurality of database relations, wherein one or more of the relations are retrieved by the processor by means of query commands performing a plurality of join operations on the relations, an improved optimizing module for use in optimizing query commands comprising means for determining whether at least one table referenced in a query statement is a hub table, means responsive to identification of a hub table for constructing a plan ("recited as a second plan") for joining the hub table and associated spoke tables; means for generating a plan ("recited as a third plan") for joining all tables referenced in the query statement; and means for enumerating all of the plans (i.e., the first, second, and third plans) to determine the best plan for joining the tables referenced in the query statement.

Another aspect of the present invention provides an improved method of optimizing query statements in relational database management systems including a data processor, a stored database, and a plurality of database relations, wherein one or more of the relations are retrieved by the processor by means of query commands by performing a plurality of join operations on the relations, the system having an optimizer for optimizing query commands and which employs a general purpose heuristic algorithm which excludes or defers Cartesian products as late in the join sequence as possible, the improvement comprising the steps of, in association with the execution of, or preferably prior to executing the general purpose algorithm, determining whether tables referenced in a query command includes a hub table and at least two encoding tables related to the hub table, when the query command references a hub table and at least two encoding tables, determining the best access plan for the hub table, determining whether the best access plan utilizes an index used to access the hub table and, if so, constructing a plan to join the encoding tables as Cartesian products, constructing a plan to join the hub table and the encoding tables and storing the plans in the data structures of the optimizer for enumeration with other access plans constructed by the optimizer.

BRIEF DESCRIPTION OF THE DRAWINGS

These and other features of the invention will become more apparent from the following description in which reference is made to the appended drawings wherein.

DESCRIPTION OF PREFERRED EMBODIMENT

Figure 1:
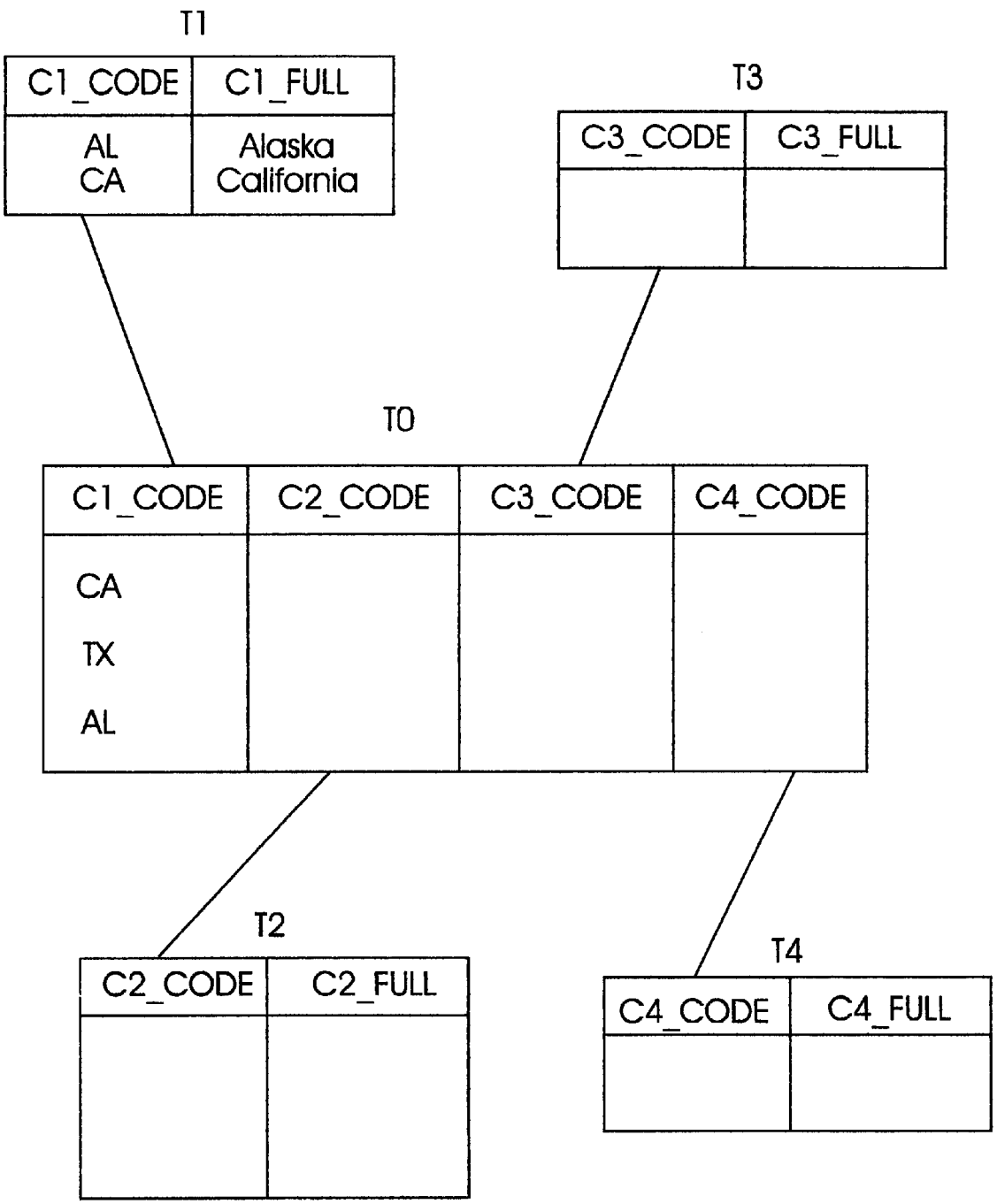
FIG. 1 diagrammatically illustrates a hub table T0 and four spoke tables T1, T2, T3 and T4.
Figure 2:
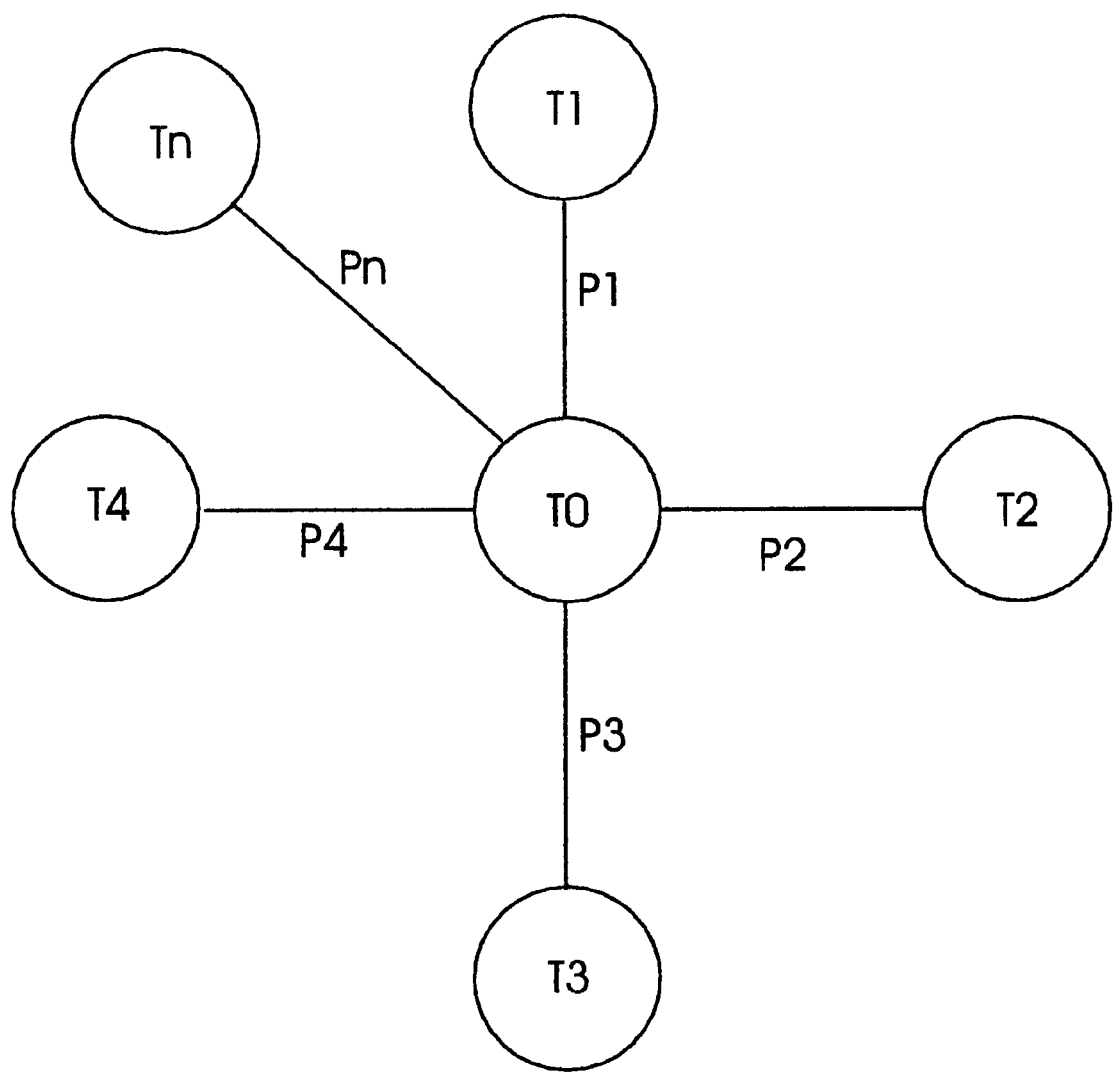
FIG. 2 is a graphical view of the tables illustrated in FIG. 1.

FIG. 1 illustrates the situations of interest of the present invention. A large table, T0, has a multi-column index on columns C1, C2, C3, . . . , Cn and join predicates P1, P2, P3, . . . , Pn on each of these columns to tables T1, T2, T3, . . . , Tn, respectively. If a graph was created where the nodes were the tables and the arcs were the predicates between the tables, table T0 would be in the center, like the hub of a wheel, the predicates P1, . . . , Pn would radiate outwardly like spokes of the wheel with encoding tables T1, . . . , Tn at the ends, but there would be no rim connecting each spoke to each other. FIG. 2 illustrates the graph. Table T0 will be referred to as the "hub table" and each of the encoding tables T1, . . . , Tn will be referred to as a "spoke table".

In a query to hub table T0, the decoded value must be found for each encoded value in a column Cj of the hub table by joining each column Cj with the encoding column of its corresponding spoke table Tj. For example, table T0 might have a column called "STATE_CODE" for storing a two-letter abbreviation for a state or province. The encoding table for this column, say T1, would have two columns: one column with the possible values that STATE_CODE can take on, and the other column called STATE_FULL with the corresponding unabbreviated value. One such row would have the values "CA" and "California" and another would have the values "AL" and "Alaska". Any query having a predicate on the unabbreviated value would have to translate the predicate into a predicate on the value of STATE_CODE by adding a join predicate between large table T0 and encoding table T1, i.e.

WHERE T1.STATE-FULL='CALIFORNIA' AND T0.STATE-CODE=T1.STATE-CODE

Since there are no join predicates relating any of the encoding tables to each other, joining the encoding tables to each other is not considered by most join enumerators, due to the general-purpose heuristic deferring Cartesian products. However, when there are multi-column indexes on the encoded columns of hub table T0 and the query has limiting predicates on the encoding tables, this general-purpose heuristic is actually counter-productive because it will not consider the best execution strategy which is to first join the encoding tables as Cartesian products and then use the rows so formed to access the data table T0 using the multi-column index and the join predicates as start/stop key conditions.

In accordance with the present invention, the optimizer first determines whether such a situation exists, identifies the hub table and its spoke tables and then evaluates the cost of the plan that overrides the usual deferral of Cartesian products by joining each of the encoding tables with Cartesian products before proceeding with the normal query optimization. In this way, the plan produced by the present invention competes based on its estimated cost with all other plans that the optimizer considers when determining the optimal plan. The present invention can be incorporated into existing optimizers or it may be implemented as a separate utility which is called by existing optimizer at the appropriate point before the rest of the normal optimization routines. In the following description, the term optimizer or main optimizer refers to existing optimizers and the term module refers to the utility of the present invention.

Figure 3:
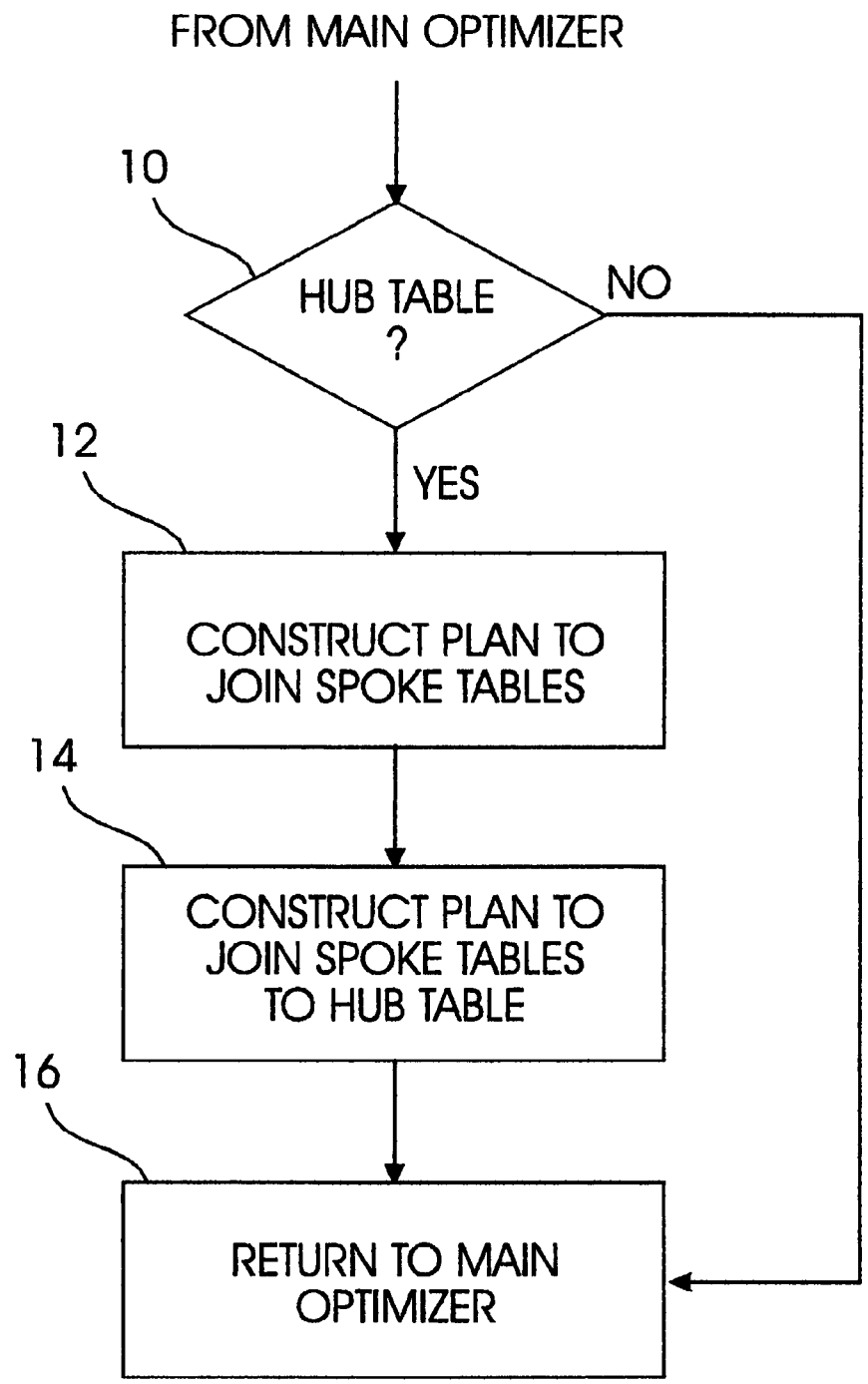
FIG. 3 is an overview of the flow of the major modules or steps according to the preferred embodiment of the optimizer of the present invention.
Figure 4A:
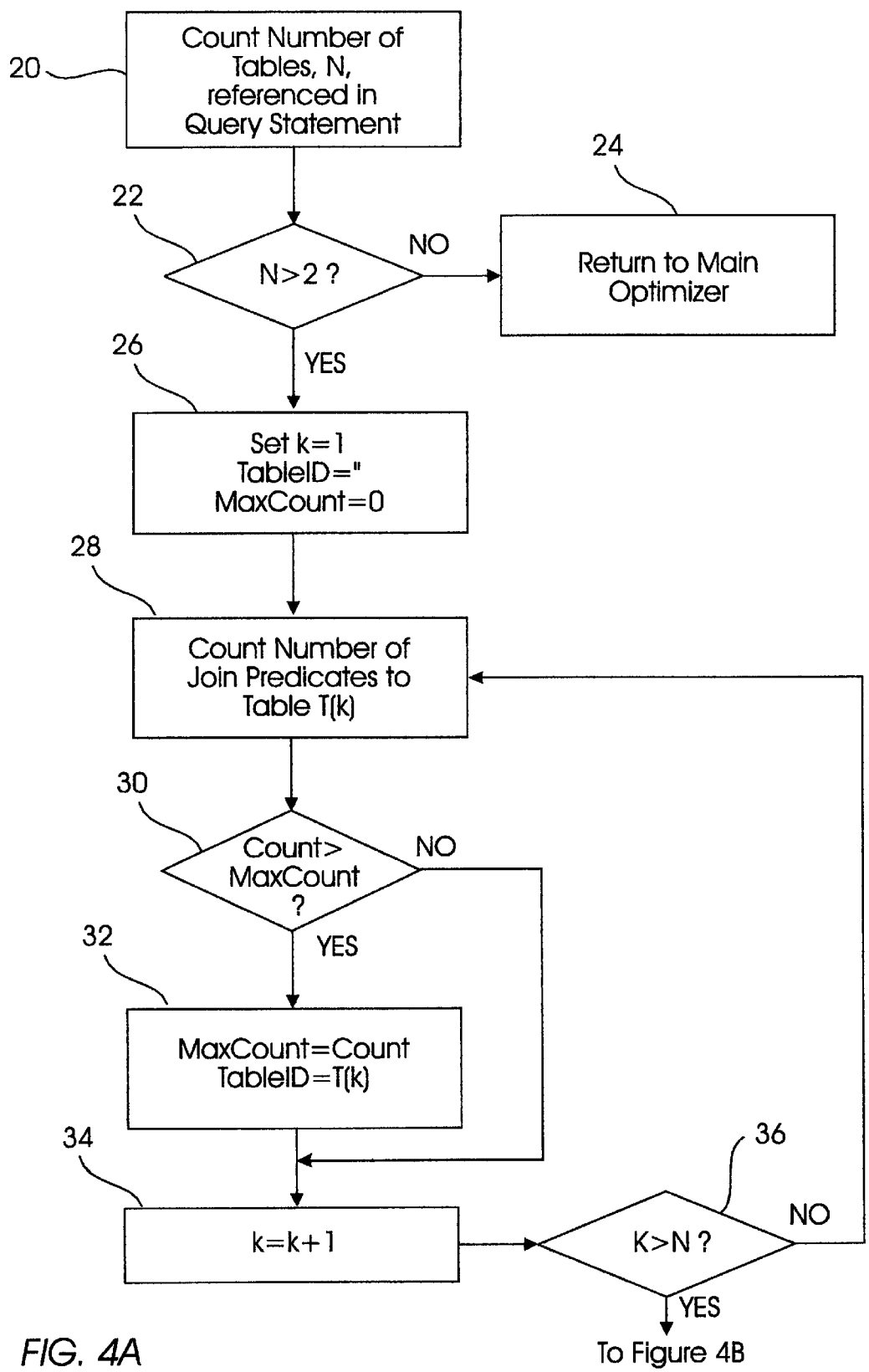
FIGS. 4a and 4b are flow diagrams illustrating the first major component or step according to the preferred embodiment of the optimizer of the present invention.
Figure 4B:
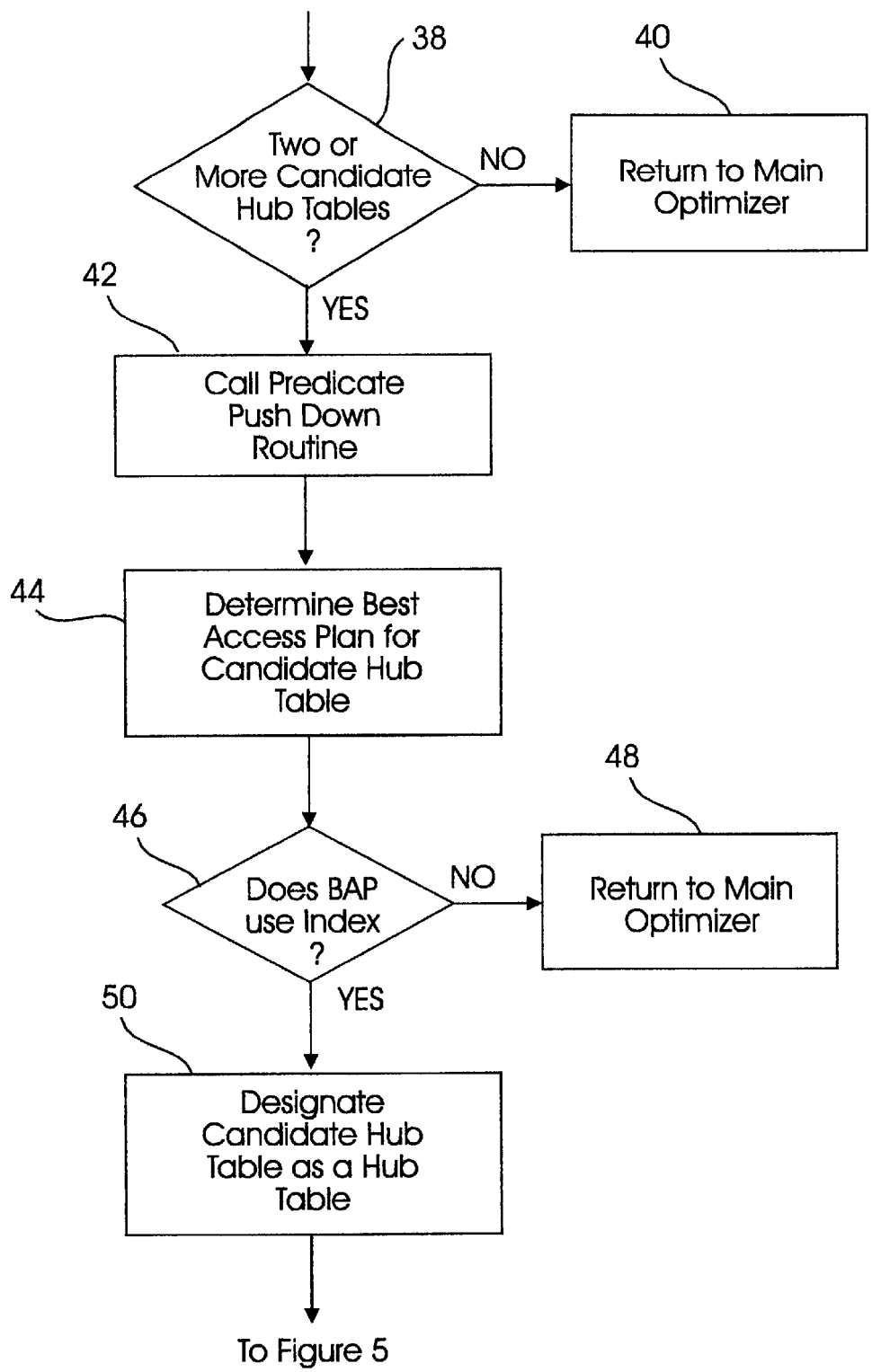
Figure 5:
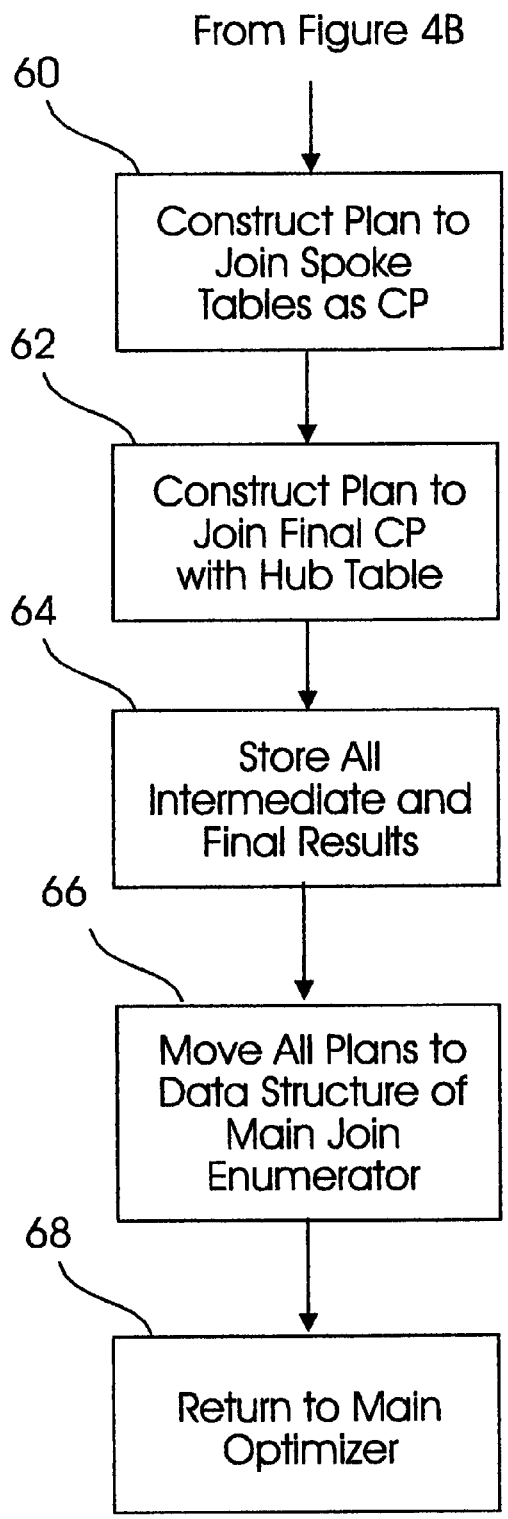
FIG. 5 is a flow diagram illustrating the second and third major components or steps according to the preferred embodiment of the optimizer of the present invention.

FIG. 3 illustrates the three major components or steps of the module of the present invention. At the appropriate point in the routine of the main optimizer before the normal optimization routines are executed, the main optimizer invokes the present invention. The first component 10 determines whether the tables referenced in the query statement include a hub table as defined above. FIGS. 4a and 4b, described below, illustrate the various steps of component 10. If component 10 fails to identify a hub table, process control returns to the main optimizer and normal optimization processing is carried out. If on the other hand, component 10 succeeds in identifying a hub table, processing proceeds to component 12. Component 12 constructs and stores a plan to join the spoke tables as Cartesian products. Component 14 then constructs a plan to join the hub table with the Cartesian product constructed by component 12 and stores this plan together with the final and intermediate plans constructed by component 12 in the data structures of the main enumerator module (not shown). Processing then to the main optimizer which then proceeds with normal optimization.

Component 10 will now be described with referenced to FIGS. 4a and 4b. Step 20 counts the number of tables referenced in the FROM portion of query statement prepared by the user and stores the number in a variable N. Step 22 then compares the value of N is greater than 2. The situation of interest must have three or more tables because, if there are only two tables, there will not be two encoding tables which would not have a join predicate between them. Thus, if there are at less then three tables, the module returns to the main optimizer at 24.

However, if there are at least three tables to join, steps 26, 28, 30, 32, 34 and 36 loop through each of the tables in turn in an effort to identify a table having more join predicates than any of the other tables. In step 26, initializes a counter k, and variables TableID and MaxCount. TableID is used to store the identity of the current hub table candidate and MaxCount stores the largest number of join predicates. Step 26 counts the number of distinct other tables that are joined by join predicates to the current table. The number is stored in a variable count. These other tables are potential spoke tables. Step 30 compares the value of count with the value of MaxCount. If Count is larger it replaces the value of MaxCount with the value of Count, increments the value of k at 36 and then loops back to step 28. In the first iteration, the name of the first table is stored in TableID and the count for the first table will be stored in MaxCount. When the value of k exceeds the value of N, the module breaks out of the loop at step 36 and proceeds to step 38 in FIG. 4b.

Another characteristic of the encoding/decoding or hub/spoke table situation is that there is only one hub table and, thus, there will be only one table with the largest number of spoke tables. Accordingly, when all tables have been considered, the optimizer determines at step 38 whether there is more than one table with the largest number of spoke tables. If so, then control returns to the main optimizer. However, this step is optional. If there are two or more candidate hub tables with the same, largest number of candidate spoke tables, each may be analyzed in the manner described below if desired.

In either case, the module temporarily considers the join predicates of the candidate hub table as local predicates by calling "predicate push-down" routine at 42. "Predicate push-down" of join predicates routines are well known in the art and, accordingly, are not described in detail herein. The module then determines at step 44 the best access plan for the table when all of the local predicates plus the pushed-down join predicates of the candidate table are applied. Best Access Plan routines are well known in the art and therefore need not be described herein. The main optimizer already incorporates such a routine and the routine can be called from this module of the present invention.

Step 46 determines whether the winning access plan utilizes an index, the candidate table is identified as a hub table at step 50 and processing proceeds to the next major component. Otherwise, control reverts at 48 to the main optimizer.

Figure 7:
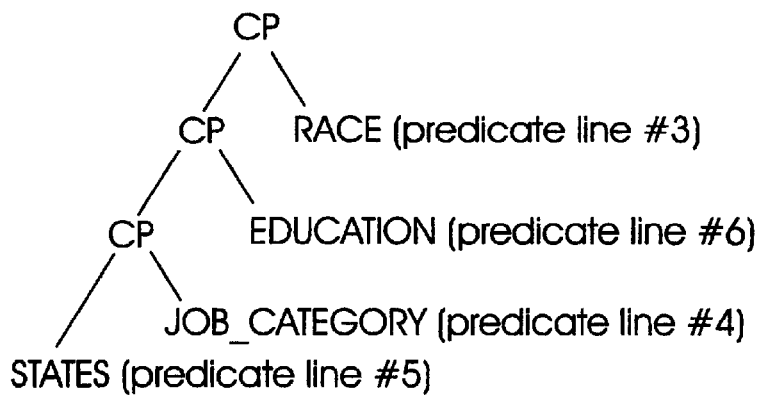
FIG. 7 illustrates an operator tree constructed by joining all spoke tables by the component illustrated in FIG. 5.
Figure 8:
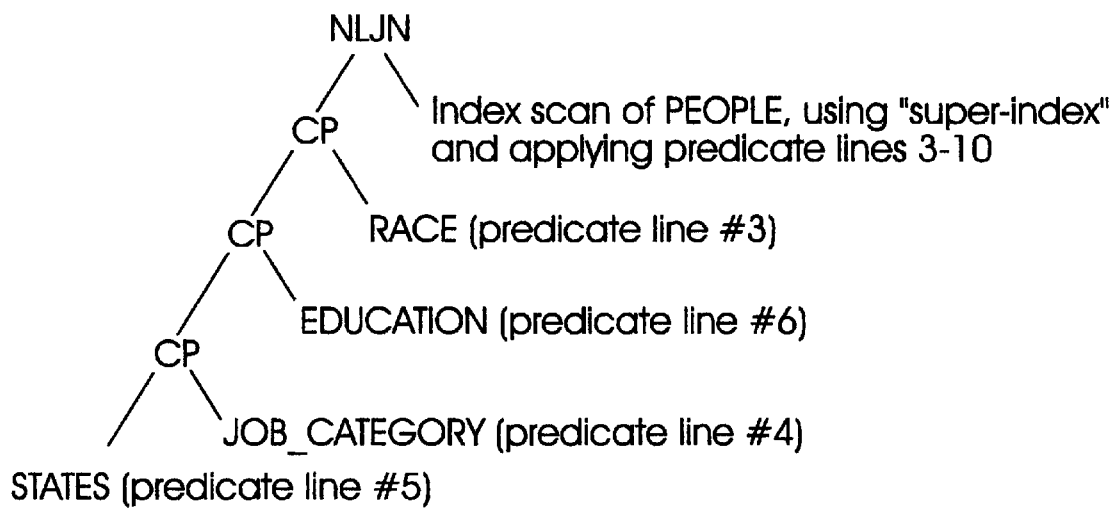
FIG. 8 illustrates an operator tree constructed by the component illustrated in FIG. 5 by joining the hub table with the operator tree illustrated in FIG. 6.

Once a hub table has been identified, the module of the present invention constructs a plan to join the spoke tables as a Cartesian product at step 60. More specifically, step 60 constructs a plan that will join the spoke tables that have join predicates, such as equality join predicates with columns of the index by any desired algorithm. A preferred algorithm is known as the Greedy algorithm. Step 62 then constructs a plan to join the hub table with the final Cartesian product developed at step 60. Step 64 stores the plans for all intermediate results as well as the plan for the final result. FIGS. 7 and 8, described later with reference to an example query statement, illustrate such plans.

Finally, at step 66 the module moves all of the plans for intermediate and final results to the data structures of main join enumeration routine so that the intermediate and final results are available options for the main optimizer when enumerating plans. Steps 64 and 66 can be combined, and may be done during the execution of steps 60 and 62. At step 68, control reverts to the main optimizer which then proceeds to enumerate all of the plans with any join enumeration method desired, allowing the plans for the intermediate results and for the final result to compete with similar plans produced by this step on the basis of cost.

When looking for spoke tables connected to the hub table candidate through a join predicate, the optimizer may be designed to count a table only if the join predicate is on a column that no other spoke table has a join predicate on thus far. Having more than one table joined to the same hub table column does not add value. The purpose of creating the join of the spoke tables is to allow the join between the hub table and the spoke tables so that the join predicates may be used as start/stop conditions when accessing the hub table. Unless multiple join predicates on the same column can be combined in a start/stop condition, including more than one spoke table joined to the same hub table column is not beneficial. Cost is also incurred to join the unnecessary table to the others.

EXAMPLE

Figure 6:
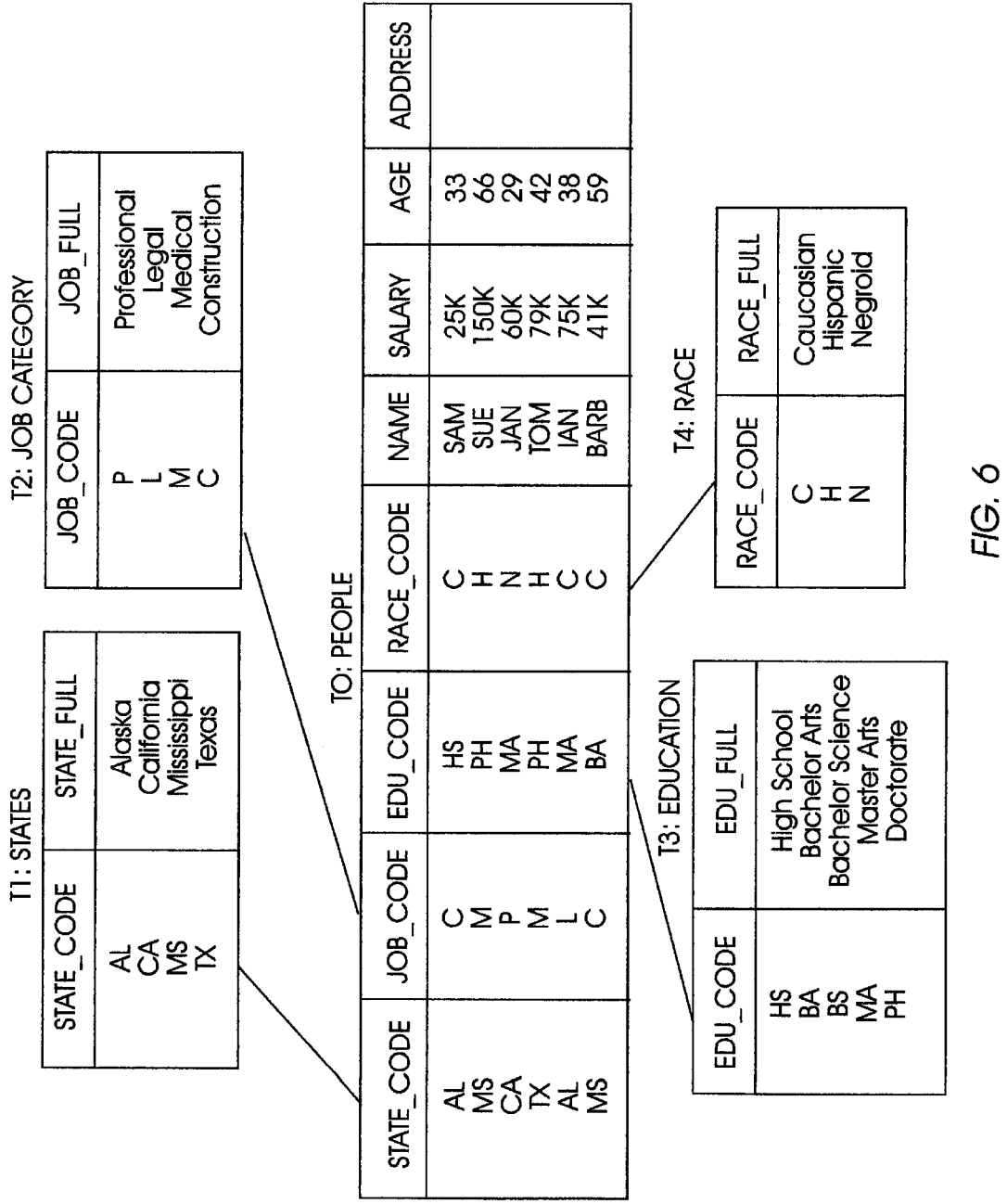
FIG. 6 is a view similar to that shown in FIG. 1 for use in illustrating a specific example of the optimization of a query statement in accordance with the preferred embodiment of the present invention.

Reference will now be made to FIG. 6 which illustrates five tables of a relational database management system. The database includes a table T0 called PEOPLE in which each row stores statistical information about one person and in which the first four columns store state, job category, education and race codes, the decoded versions of which are stored in encoding tables T1, T2, T3 and T4, and four additional columns for storing name, salary, age and address. Table T0 includes one index called "super-index" which is a concatenation of the data in the first four columns, namely, state_code, job_code, edu_code and race_code. Table T1, called STATES, is an encoding table which stores the codes and names of states and is related to table T0 by the join predicate T0.C1=T1.C1. Table T2, called JOB_CATEGORY, stores job category codes and descriptions and is related to Table T0 by join predicate T0.C2=T2.C1. Table T3, called EDUCATION, stores education codes and descriptions and is related to Table T0 by join predicate T0.C3=T3.C1 and Table T4, called RACE, stores race codes and descriptions and is related to Table T0 by join predicate T0.C4=T4.C1.

Assume that a user wishes to extract the salary and age of all Hispanics with a doctorate degree and in medical jobs in California. An appropriate query statement is as follows:

|        |                                               | Line Number |
|--------|-----------------------------------------------|-------------|
| SELECT | salary, age                                   | 1           |
| FROM   | people, states, job_category, education, race | 2           |
| WHERE  | race_full='Hispanic'                          | 3           |
| AND    | job_full='Medical'                            | 4           |
| AND    | state_full='California'                       | 5           |
| AND    | edu_full='Doctorate'                          | 6           |
| AND    | people.state_code=states.state_code           | 7           |
| AND    | people.job_code=job_category.job_code         | 8           |
| AND    | people.edu_code=education.edu_code            | 9           |
| AND    | people.race_code=race.race_code               | 10          |

Lines 3–6 specify "Local predicates" because they are "local" to a single table while lines 7–10 specify "Join predicates" as they "join" more than one table. It will be noted that there are no join predicates linking directly any of the encoding tables, namely, STATES, JOB_CATEGORY, EDUCATION, RACE. Therefore, without the method described in this invention, a join between those tables BEFORE accessing table PEOPLE would not be considered by any existing optimizers.

The module of the present invention first determines whether there are at least three tables to join. The module determines from line 2 of the query statement there are five tables to access. Therefore, the subject query meets this test.

The module then loops through each of the tables to determine the number of other tables joined to it by join predicates. The module determines from lines 7–10 of the query statement that there are four tables joined to the table PEOPLE and one table is joined to each of the other four tables. At the end of each loop, the module compares the count of the current table with the largest count thusfar determined and stores the largest count together with the identity of the table having that count. In the present example, the module will determine that the table with the largest number of tables joined to it is PEOPLE and the count is 4.

The next step is to determine whether there are any two or more tables with the same number of joins. In the example, there are none. If there were, one option would be to abandon the balance of the routine and proceed with the normal general purpose heuristic. Another option is to evaluate all of the tables which had the largest number of tables joined to it.

The next step is to assume that the join predicates are local predicates. This means that State.State.Code, Job_Category.Job.Code, Job_Education. Edu_Code, and Race.Race_.Code are fixed. This is a well-known technique in the current art called "join predicate push-down", in which the join predicates can be applied while accessing the inner table of a nested-loop join because that access is done once per row of the outer table, during which time the values from the outer column are fixed. Thus, for example, considering the join of STATES with PEOPLE using STATES as outer table and PEOPLE as inner table. Then, the predicate on line 7 will, for each row of STATES, have a fixed value of States.State_Code so that it can be applied as if it were a local predicate on PEOPLE. It will appear to the access of PEOPLE as:

fixed-value-for-STATES.STATE_CODE=PEOPLE.STATE_CODE

The next step involves determining the best access plan for the table when all of the local predicates plus the push-down join predicates are applied. This involves estimating the cost of accessing the table PEOPLE when predicates in lines 3–6 and 7–10 are applied. This is done using the existing state of the art optimizer components, as follows:

The hub table may have many indexes. The present example has only one index, named "super-index". If there were more than one index, the module would iterate through all indexes. For each index, the module performs two tasks. First, for each column of the index, the module determines the join predicates which link that column to another table. The module assumes that those join predicates can be "pushed down" on the access of PEOPLE. The join predicates are:

STATE_CODE: join predicate on line 7

JOB_CODE: join predicate on line 8

EDU_CODE: join predicate on line 9

RACE_CODE: join predicate on line 10

Second, with these predicates applied as local predicates, the index "super-index" is used to go directly to those rows that satisfy predicates in lines 7–10 of the query statement. The disk pages needed to access these rows are typically three pages in the index to get to the key values of interest, and only a handful of index pages containing the keys of interest, plus another handful of pages to access the corresponding rows (via the row identifier in the index) on the date pages to extract the information needed in the SELECT list (line 1 of the query statement) that is not in the "super-index" key values.

The only other alternative is to sequentially scan PEOPLE by applying predicates 3–10 as during the scan. Except for very small tables, this is much more expensive inasmuch as it is necessary to access every page in PEOPLE. Therefore, the winning plan uses an index and PEOPLE is the hub table with the most potential spoke tables.

As already noted, one variation of the preferred embodiment would relax the requirement that there be no ties for candidate hub tables. It would instead apply all steps described above for each of the potential hub tables which tied for having the most potential spoke tables connected to them by join predicates.

Continuing to the next step, as previously mentioned, the usual implementation of join algorithms joins only two tables at a time. Much of the computational complexity of the optimizer is attributable to assessing the cost of plans with various permutations of the ordering of N tables, joined two at a time. The usual heuristic is to avoid Cartesian products, i.e. those pairs for which there is no join predicate to reduce the result size somewhat.

In the present invention, the next step is to compute the cost of constructing a Cartesian product of the spoke tables first using state-of-the-art optimization techniques. The spoke tables are any potential spoke tables whose columns have a join predicate that references a column in the index used to access the hub table. In this example, all four potential spoke tables individually have a join predicate that references a column in "super-index", so all are spoke tables. If, however, "super-index" did not exist, and there was only an index named "3col" on columns RACE_CODE, JOB_CODE, and EDU_CODE and that index was the cheapest way to access PEOPLE, then only RACE, JOB_CATEGORY, and EDUCATION would be spoke tables.

Returning to the plan using "super-index", suppose that the spoke tables had the following number of rows after applying their local predicates (whose line number is given):

| Table | Local Predicate Line Number | Remaining Rows |
|---|---|---|
| STATES | 5 | 1 |
| JOB_CATEGORY | 4 | 1 |
| EDUCATION | 6 | 1 |
| RACE | 3 | 1 |

Since the size of each table, when reduced by local predicates, is only one row in this case, the order of forming the Cartesian products of these tables does not matter. If the size differed, however, most general purpose heuristics order them in increasing size. Thus, the plan to join all the tables appears like the operator tree shown in FIG. 7, where CP stands for Cartesian product.

It will be seen that there are three Cartesian products. The first Cartesian product joins tables STATES and JOB_CATEGORY, the second Cartesian product joins the first Cartesian product and table EDUCATION and the third Cartesian product joins the second Cartesian product and table RACE. The result of each Cartesian product operation is called an "intermediate result", regardless whether the results of the operation are ever materialized in one place, such as, for example, putting them to a temporary table. The module of the present invention saves those plans and their estimated cost of execution for consideration by the main optimizer.

The module also constructs the plan that joins the operator tree shown in FIG. 7 with the hub table to provide a plan that will produce the final result of the query as shown as an operator tree in FIG. 8. The estimated cost of this plan is determined using existing state of the art techniques and saved together with all the intermediate plans used in its construction.

The above described steps merely generated a plan that otherwise would not be generated by general purpose heuristics. There is no guarantee it is the best plan, although often it is. The next step then is to construct the other plans that would normally be constructed and evaluated in state-of-the-art optimizers and lets those plans compete against the plans constructed in by the module of the present invention. The plan for the final result whose estimated cost is least will be chosen by the optimizer to be executed to satisfy the query.

While the preferred embodiment of the present invention has been illustrated in detail, it should be apparent that various modifications and alterations may occur to one skilled in the art without departing from the scope of the present invention as set forth in the following claims.

The embodiments of the invention in which an exclusive property of privilege is claimed are defined as follows:

1. In a relational database management system including a data processor, a stored database, and a plurality of database relations stored in the form of tables, wherein one or more of said relations are retrieved by the processor responsive to a query statement which specifies desired relations, the query statement including first, second, and third tables, and further including a join predicate between relations of the first and second tables and a join predicate between relations of the first and third tables, but not including a join predicate between the relations of the first and third tables, the system producing first plans for performing a plurality of join operations on the desired relations, an optimizing module for use in optimizing query commands, the optimizing module comprising:

means for determining that the first table referenced in the query statement is a hub table, and for determining that the second and third tables are spoke tables associated with the hub table because of the respective join predicates therebetween;

means, operable responsive to identification of the hub table, for constructing a second plan for joining the hub table and the associated spoke tables;

means for generating a third plan for joining the second and third tables of the desired relations referenced in said query statement; and means for enumerating the first, second, and third plans to determine the best plan for joining said tables referenced in said query statement.

2. A query optimizer as defined in claim 1, said determining means further including:

means for determining the identity of the table in said query statement having the largest number of distinct tables of the tables in said query statement joined to it by a join predicate and the magnitude of said largest number;

means for determining the best access plan for said table having the largest number of tables which are joined to it; and means for determining whether said best access plan utilizes an index.

3. In a query optimizer as defined in claim 1, said determining means further including:

means for determining whether said query statement includes more than two tables and, if so, means for counting the number of distinct tables of each of the tables referenced in said query statement which are joined by join predicates to the other tables in said query statement; and means for storing the identity of the table having the largest number of tables which are joined to it and the magnitude of said largest number.

4. A query optimizer as defined in claim 3, said determining means further including:

means for determining the best access plan for said table having the largest number of tables which are joined to it when all local predicates and push-down predicates are applied; and means for determining whether said table having the largest number of tables which are joined to it utilizes an index and, if so, designating said table having the largest number of tables which are joined to it as a hub table;

join predicate push-down means for applying join predicates between said tables as local predicates.

5. A query optimizer as defined in claim 1, said determining means further including:

means for determining whether said query statement includes more than two tables and, if so, means for counting the number of distinct tables of each of the tables referenced in said query statement which are joined by join predicates to the other tables in said query statement; and means for storing the identity of the table having the largest number of tables which are joined to it and the magnitude of said largest number;

means for determining the best access plan for said table having the largest number of tables which are joined to it when all local predicates and push-down predicates are applied; and means for determining whether said table having the largest number of tables which are joined to it utilizes an index and, if so, designating said table having the largest number of tables which are joined to it as a hub table.

6. In a query optimizer as defined in claim 1, said responsive means further including:

means for designating said table having the largest number of tables which are joined to it as a hub table and designating tables joined to said hub table by join predicates in said query statement as spoke tables;

means for computing the cost of constructing a Cartesian product of said spoke tables for each index of said hub table; and means for storing each said plan for joining and all intermediate plans.

7. For use by a relational database management system, the system including a data processor, a stored database, and a plurality of database relations, wherein one or more of said relations are retrieved by the processor by means of a query command, the query command including first, second, and third tables, and further including a join predicate between relations of the first and second tables and a join predicate between relations of the first and third tables, but not including a join predicate between the relations of the first and third tables, by performing a plurality of join operations on said relations, the system further including an optimizer for optimizing the query command, the optimizer employing a general purpose heuristic algorithm which excludes or defers Cartesian products as late in the join sequence as possible, a method comprising the steps of:

in association with the execution of said general purpose algorithm, determining that the first table referenced in the query command includes a hub table, and for determining that the second and third tables are related to said hub table as encoding tables because of the respective join predicates therebetween; and responsive to the query command referencing a hub table and at least two encoding tables, performing the steps of:
(i) determining the best access plan for said hub table,
(ii) determining whether said best access plan utilizes an index used to access said hub table,
(iii) if so, constructing a plan to join said encoding tables as Cartesian products,
(iv) constructing a plan to join said hub table and said encoding tables, and (v) storing said plans in the data structures of said optimizer for enumeration with other access plans constructed by said optimizer.

8. A method as defined in claim 7, said step of determining whether tables referenced in said query command include a hub table and at least two encoding tables related to said hub table further including the step of, for each table referenced in said query command, counting the number of tables which are joined to it by join predicates and storing the identity of the table having the largest number of tables joined to it and the magnitude of said largest number.

9. A method as defined in claim 8, further including the step of applying a predicate push-down algorithm with respect to said join predicates prior to determining said best access plan.

10. A method as defined in claim 9, further including the steps of:

for each index of said hub table, for each column of the index determining the join predicates which link said column to one of said encoding tables; and applying said join predicates as local predicates, using said column of said index to access those rows of said table which satisfy join predicates in query statement.

11. For use by a relational database management system including a data processor, a stored database, and a plurality of database relations, wherein one or more of said relations are retrieved by the processor by means of a query command, the query command including first, second, and third tables, and further including a join predicate between relations of the first and second tables and a join predicate between relations of the first and third tables, but not including a join predicate between the relations of the first and third tables, by performing a plurality of join operations on said relations, the system further including an optimizer for optimizing the query command, the optimizer employing a general purpose heuristic algorithm which excludes or defers Cartesian products as late in the join sequence as possible, a method comprising the steps of:

in association with the execution of said general purpose algorithm, determining that the first table referenced in the query command includes a hub table and for determining that the second and third tables are related to said hub table as encoding tables because of the respective join predicates therebetween, the step of determining including:
(i) the step, executed for each table referenced in said query command, of counting the number of tables which are joined to the referenced table by join predicates, and
(ii) the step of storing the identity of the table having the largest number of tables joined to it and the magnitude of said largest number;

responsive to the query command referencing a hub table and at least two encoding tables,
(i) determining the best access plan for said hub table,
(ii) determining whether said best access plan utilizes an index used to access said hub table and, if so:
(a) for each index of said hub table and for each column of the index, determining the join predicates which link said column to one of said encoding tables, and applying said join predicates as local predicates, using said column of said index, to access those rows of said table which satisfy the join predicates in the query statement;
(b) constructing a plan to join said encoding tables as Cartesian products;
(c) constructing a plan to join said hub table and said encoding tables; and (d) storing said plans in the data structures of said optimizer for enumeration with other access plans constructed by said optimizer.

12. For use by a relational database management system, the system including a data processor, a stored database, and a plurality of database relations, wherein one or more of said relations are retrieved by the processor by means of a query command, the query command including first, second, and third tables, and further including a join predicate between relations of the first and second tables and a join predicate between relations of the first and third tables, but not including a join predicate between the relations of the first and third tables, by performing a plurality of join operations on said relations, the system further including an optimizer for optimizing query commands and which employs a general purpose heuristic algorithm which excludes or defers Cartesian products as late in the join sequence as possible, the improvement comprising the steps of:

in association with the execution of said general purpose algorithm, determining whether the first table specified in the query command includes a hub table, and further determining whether the second and third tables specified in the query command include two tables related to the hub table as encoding tables because of the respective join predicates therebetween; and when said tables include two or more encoding tables, executing the steps of:
(i) determining a best access plan for said table related to two or more encoding tables when said tables includes two or more encoding tables;
(ii) determining whether said best access plan employs an index used to access said table related to two or more encoding tables; and
(iii) if so, executing the steps of:
(a) constructing a plan to join said encoding tables as a first Cartesian product;
(b) constructing a plan to join said table related to two encoding tables; and
(c) storing each said plan in the data structures of said optimizer for enumeration with other plans constructed by said optimizer.

13. A relational database management system as in claim 7, wherein the step of determining whether tables referenced in a query command includes a hub table and at least two encoding tables related to said hub table related to said hub table is carried out prior to executing said general purpose algorithm.

14. A relational database management system as in claim 11, wherein the step of determining whether tables referenced in a query command includes a hub table and at least two encoding tables related to said hub table related to said hub table is carried out prior to executing said general purpose algorithm.

15. A relational database management system as in claim 12, wherein the step of determining whether tables referenced in a query command includes a hub table and at least two encoding tables related to said hub table related to said hub table is carried out prior to executing said general purpose algorithm 1.

* * * * *